(12) United States Patent
Häkli et al.

(10) Patent No.: US 12,034,388 B2
(45) Date of Patent: Jul. 9, 2024

(54) MOTOR DRIVE ADAPTATION

(71) Applicant: Vacon Oy, Vaasa (FI)

(72) Inventors: Simo Häkli, Nordborg (DK); Nicklas Södö, Nordborg (DK)

(73) Assignee: VACON OY, Vaasa (FI)

( * ) Notice: Subject to any disclaimer, the term of this patent is extended or adjusted under 35 U.S.C. 154(b) by 613 days.

(21) Appl. No.: 16/621,750

(22) PCT Filed: Jul. 27, 2017

(86) PCT No.: PCT/EP2017/069005
§ 371 (c)(1),
(2) Date: Dec. 12, 2019

(87) PCT Pub. No.: WO2019/020185
PCT Pub. Date: Jan. 31, 2019

(65) Prior Publication Data
US 2020/0136544 A1 Apr. 30, 2020

(51) Int. Cl.
*H02P 23/14* (2006.01)
*G01H 13/00* (2006.01)
*G05B 13/02* (2006.01)
*H02M 1/12* (2006.01)
*H02M 7/44* (2006.01)
(Continued)

(52) U.S. Cl.
CPC ............ *H02P 23/14* (2013.01); *G01H 13/00* (2013.01); *G05B 13/02* (2013.01); *H02M 1/126* (2013.01); *H02M 7/44* (2013.01); *H02P 23/0004* (2013.01); *H02P 27/06* (2013.01)

(58) Field of Classification Search
CPC ........ H02P 23/14; H02P 23/004; H02P 27/06; H02P 23/0004; H02P 23/00; H02M 1/126; H02M 7/44; G05B 13/02; G01H 13/00
See application file for complete search history.

(56) References Cited

U.S. PATENT DOCUMENTS

| | | | |
|---|---|---|---|
| 5,644,199 A * | 7/1997 | Nojima | H02N 2/166 310/314 |
| 2010/0188071 A1* | 7/2010 | Kajouke | G01R 31/2837 324/76.39 |

(Continued)

FOREIGN PATENT DOCUMENTS

| | | |
|---|---|---|
| CN | 1603845 A | 4/2005 |
| CN | 101738567 A | 6/2010 |

(Continued)

OTHER PUBLICATIONS

International Search Report for Serial No. PCT/EP2017/069005 Dated Apr. 26, 2018.

(Continued)

*Primary Examiner* — Muhammad S Islam
(74) *Attorney, Agent, or Firm* — McCormick, Paulding & Huber PLLC (57) ABSTRACT

A method and apparatus for the adaptation of a motor drive system is described. The method includes applying a small signal frequency sweep to a motor drive system wherein the motor drive system includes an inverter, an output filter (e.g. a sine filter) and a motor, acquiring frequency response data in response to said frequency sweep and setting parameters of the motor drive system depending on the acquired frequency response data.

23 Claims, 5 Drawing Sheets

(51) Int. Cl.
*H02P 23/00* (2016.01)
*H02P 27/06* (2006.01)

(56) References Cited

U.S. PATENT DOCUMENTS

| | | | | |
|---|---|---|---|---|
| 2012/0086384 | A1* | 4/2012 | Peto | G01P 3/46 |
| | | | | 318/799 |
| 2015/0283911 | A1* | 10/2015 | Ambrosio | B60L 50/40 |
| | | | | 307/10.1 |
| 2016/0013715 | A1* | 1/2016 | Patel | H02M 1/126 |
| | | | | 363/44 |
| 2017/0063268 | A1 | 3/2017 | da Silva et al. | |

FOREIGN PATENT DOCUMENTS

| | | |
|---|---|---|
| CN | 101788606 A | 7/2010 |
| CN | 101849341 A | 9/2010 |
| CN | 102047549 A | 5/2011 |
| CN | 102067442 A | 5/2011 |
| CN | 103134484 A | 6/2013 |
| CN | 104124883 A | 10/2014 |
| CN | 104833725 A | 8/2015 |
| CN | 105049024 A | 11/2015 |
| CN | 105245095 A | 1/2016 |
| CN | 105954353 A | 9/2016 |
| CN | 106789777 A | 5/2017 |
| JP | H10-276232 A | 10/1998 |

OTHER PUBLICATIONS

"Determination of Quartz Crystal Resonant Frequency by a Novel Multi-Sinusoidal-Signals Approach", Kui Han, et al., 2011 2nd Intl Conf on Innovative Computing & Communication and 2010 Asia-Pacific Conf on Information Technology & Ocean Engineering, pp. 189-191, Mar. 2011.

First Office Action issued for Chinese Patent Application No. 201780090052.4, dated Sep. 30, 2022 and its English translation.

* cited by examiner

MOTOR DRIVE ADAPTATION

CROSS-REFERENCE TO RELATED APPLICATIONS

This application is a National Stage application of International Patent Application No. PCT/EP2017/069005, filed on Jul. 27, 2017, which is hereby incorporated by reference in its entirety.

TECHNICAL FIELD

The present invention relates to a method and apparatus for adapting a motor drive system.

BACKGROUND

Figure 1:
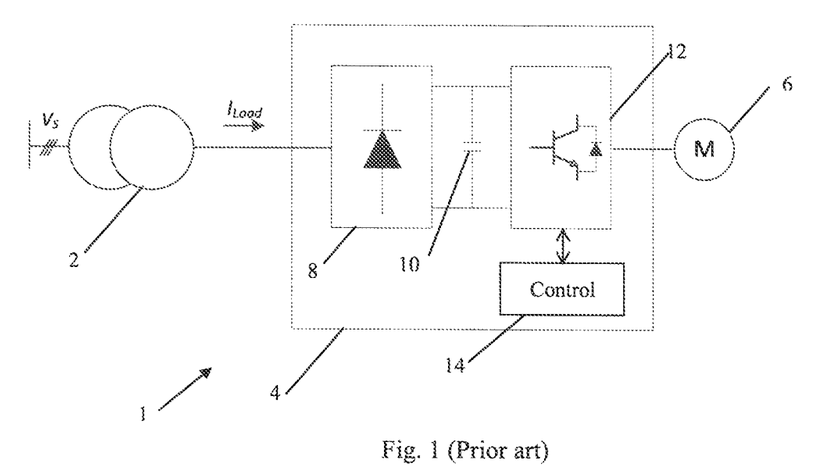
FIG. 1 shows an inverter drive system.

FIG. 1 is a block diagram of a system, indicated generally by the reference numeral 1, including an adjustable speed drive (ASD). The system 1 comprises an AC power supply 2, an ASD 4 and a load 6 (such as a three-phase motor). The ASD 4 includes a rectifier 8, a DC link capacitor 10, an inverter 12 and a control module 14.

The output of the AC power source 2 is connected to the input of the rectifier 8. The output of the rectifier 8 provides DC power to the inverter 12. As described further below, the inverter 12 includes a switching module used to convert the DC voltage into an AC voltage having a frequency and phase dependent on gate control signals. The gate control signals are typically provided by the control module 14. In this way, the frequency and phase of each input to the load 6 can be controlled.

The inverter 12 might typically be in two-way communication with the control module 14. The inverter 12 may monitor currents and voltages in each of the three connections to the load 6 (assuming a three-phase load is being driven) and may provide current and voltage data to the control module 14 (although the use of both current and voltage sensors is by no means essential). The control module 14 may make use of the current and/or voltage data (where available) when generating the gate control signals required to operate the load as desired; another arrangement is to estimate the currents from the drawn voltages and the switching patterns—other control arrangements also exist.

Figure 2:
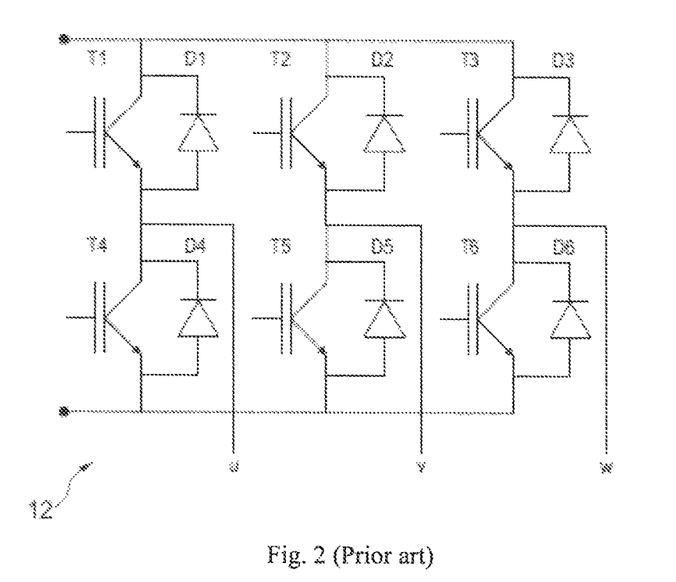
FIG. 2 shows an exemplary inverter.

FIG. 2 shows details of an exemplary implementation of the inverter 12.

As shown in FIG. 2, the inverter 12 comprises first, second and third high-sided switching elements (T1, T2 and T3) and first, second and third low-sided switching elements (T4, T5 and T6). Each switching element may, for example, be an insulated-gate bipolar transistor (IGBT) or a MOSFET transistor. Each switching element may further be associated with a corresponding free-wheeling diode (D1 to D6).

The exemplary inverter 12 shown in FIG. 2 is a three-phase inverter can be used to generate three outputs: U, V and W. The three phases of the inverter 12 provide inputs to the three-phases of the load 6 in the system 1 described above. Of course, the inverter 12 could be modified to provide a different number of outputs in order to drive a different load (such as a load with more or fewer than three phases).

Typically, the first high-sided switching element T1 and the first low-sided switching element T4 are connected together between the positive and negative DC terminals, with the mid-point of those switching elements provides the U-phase output. In a similar manner, the second high-sided switching element T2 and the second low-sided switching element T5 are typically connected together between the positive and negative DC terminals with the mid-point of those switching elements providing the V-phase output. Furthermore, the third high-sided switching element T3 and the third low-sided switching element T6 are typically connected together between the positive and negative DC terminals with the mid-point of those switching elements providing the W-phase output.

The conventional inverter 12 described above is a 2-level, 6-transistor inverter. As will be apparent to those skilled in the art, the principles of the present invention are applicable to different inverters, such as 3-level inverters. The description of the inverter 12 is provided by way of example to help illustrate the principles of the present invention.

As described in detail below, the output of the inverter 12 may be filtered and may be transmitted along one or more cables. Such filtering and transmission has an impact on the performance of the inverter in a manner that can be detrimental to the performance of the inverter system.

The present invention seeks to address at least some of the problems outlined above.

SUMMARY

The present invention provides a method comprising: applying a small signal frequency sweep to a motor drive system wherein the motor drive system includes an inverter, an output filter (such as a sine filter) and a motor (and typically also includes a rectifier and a DC link stage, the motor drive system may also include one or more cables and may include multiple motors); acquiring frequency response data in response to said frequency sweep in order to determine (electrical) resonances in the motor drive system; and setting parameters (such as an optimum and/or a maximum switching frequency of said inverter of the motor drive system) depending on the acquired frequency response data.

The present invention also provides motor drive system comprising an inverter stage, a control module (and typically a rectifier stage and a DC link stage) and an output filter (and possibly one or more motors), wherein the control module is configured to set parameters (such as an optimum and/or a maximum switching frequency of said inverter of the motor drive system) of the motor drive system depending on a measured frequency performance of the motor drive system, wherein the frequency performance is measured in response to applying a small signal frequency sweep to the motor drive system (which frequency sweep may be applied under the control of said control module). One or more cables may be provided connecting an output of the inverter stage to one or more motors. In such an arrangement, the frequency performance of the system may include the performance of the cable connection(s) and the motor(s).

The present invention yet further provides a computer program (or a computer program product) comprising: code (or some other means) for applying a small signal frequency sweep to a motor drive system (wherein the motor drive system includes an inverter, an output filter and a motor); code (or some other means) for acquiring frequency response data in response to said frequency sweep in order to determine (electrical) resonances in the motor drive system; and code (or some other means) for setting parameters of the motor drive system depending on the acquired frequency response data.

Applying a small signal frequency sweep may comprise applying a low voltage magnitude signal (typically just a few volts, such as 5V RMS) to the motor over a frequency range (e.g. 300-5000 Hz).

The acquired frequency response data may comprise current data as a function of frequency resulting from the applied frequency sweep.

In one form of the invention, applying the small signal frequency sweep comprises applying multiple small signal frequency sweeps at different DC offset levels (by applying a DC magnetising pulse (or level)) and acquiring frequency response data comprises acquiring frequency response data for each of said multiple small signal frequency sweeps.

The invention may further comprise applying a DC magnetising pulse (of varying levels) and repeating said frequency sweep applying and frequency response data acquiring steps. A number of DC magnetising pulses may be applied and applying the DC magnetising pulses may include comprising incrementing said DC magnetising pulses.

The invention may include repeating said frequency sweep applying and frequency response data acquiring (and possibly also the parameter setting steps) periodically (e.g. weekly or monthly). The invention may further comprise determining whether a change in said frequency response data is indicative of a significant performance change (and, if so, raising an alert).

BRIEF DESCRIPTION OF THE DRAWINGS

The invention will now be described in further detail with reference to the following schematic drawings, in which.

DETAILED DESCRIPTION

Figure 3:
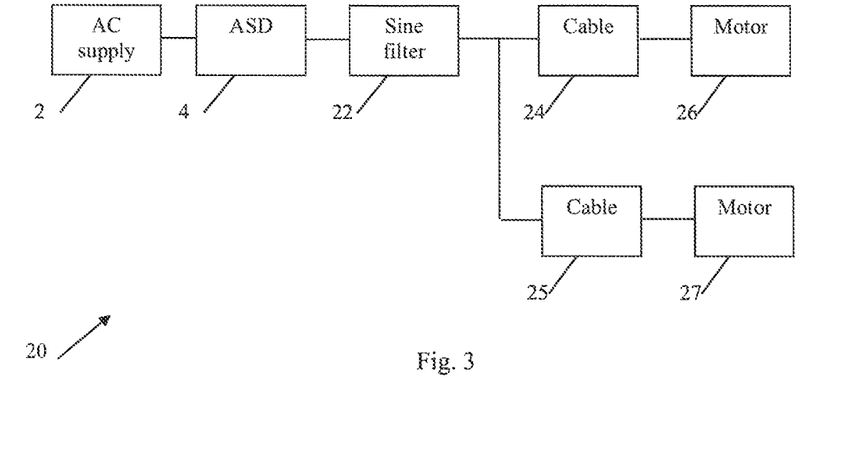
FIG. 3 shows a highly schematic motor drive system in accordance with an aspect of the present invention.

FIG. 3 shows a motor drive system, indicated generally by the reference numeral 20, in accordance with an aspect of the present invention.

The motor drive system 20 includes the AC power supply 2 and adjustable speed drive (ASD) 4 described above. An output filter 22 (typically a sine filter) is provided to filter the output of the ASD 4. As shown in FIG. 3, the exemplary system 20 includes a first cable 24 connecting the output of the filter 22 to a first motor 26 and a second cable 25 connecting the output of the filter 22 to a second motor 27. The specific arrangement shown in FIG. 3 is not essential to all embodiments of the invention. For example, more motors could be provided in parallel. Further, a single motor (and hence a single cable) could be provided (omitting, for example, the cable 25 and the motor 27).

There are a number of reasons why sine filters (such as the filter 22) may be provided in the motor drive system 20. In some motor drive systems, long motor cables may be required, which may necessitate the use of a sine filter. Other possible reasons for requiring a sine filter include low audible noise requirements or the use of a motor with insulation that cannot withstand PWM voltages. In order to get a reliable operation of the system 20, the converter, filter and motor combinations should be matched together. There are many reasons why this can be difficult in practice.

There are a number of parameters that have an effect on the operation of the system 20. One parameter is the resonance frequency of the output filter 22 in combination with the cable and motor impedances. This resonance frequency depends, amongst other things, on motor cable length(s) and motor impedance(s) which can vary quite a lot depending on motor types.

A particular problem arises in the event that different entities provide different elements of the system 20. For example, it is known for an end user to provide the output filter 22, with the effect that it is difficult for the provider of the ASD 4 to provide the appropriate control parameters for the system 20.

A special case where the resonance frequency may change significantly is a multi-motor installation (with one output filter supplying many motors), where the number of motors in use varies with time.

Figure 4:
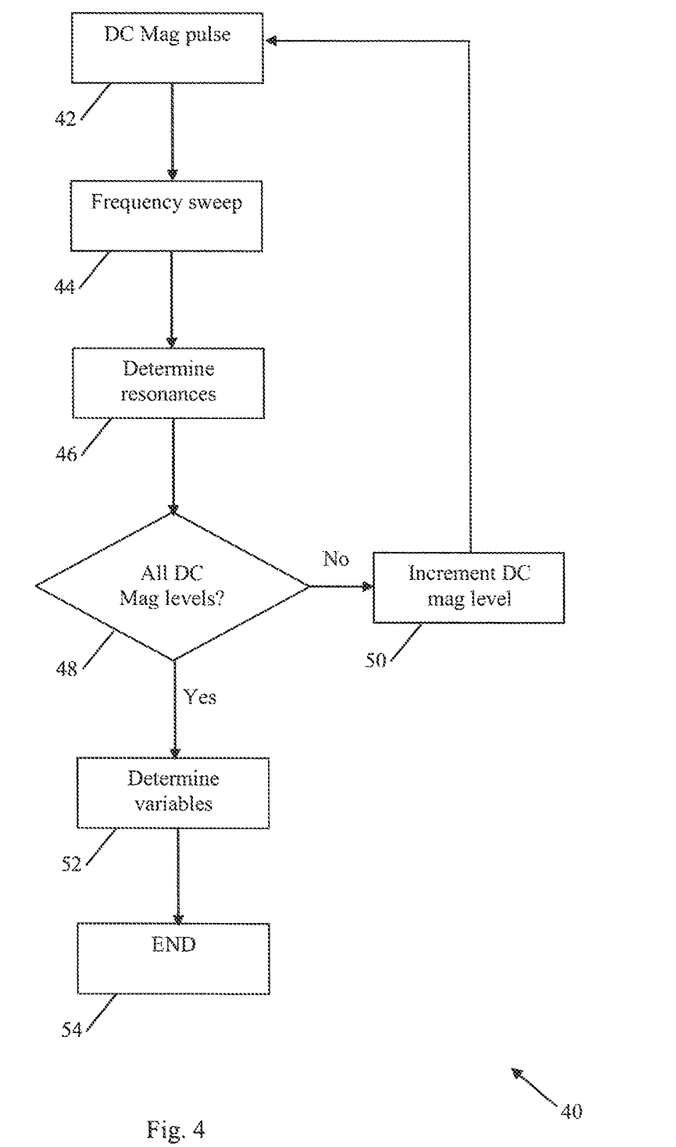
FIG. 4 is a flow chart showing an algorithm in accordance with an exemplary use of the system of the present invention.

FIG. 4 is a flow chart showing an algorithm, indicated generally by the reference numeral 40, demonstrating an exemplary use of the system of the present invention.

The algorithm 40 starts at step 42 where a DC-magnetization pulse (or level) is applied to the motor(s). One purpose of the DC-magnetization pulse is to prevent the rotor from turning during the adaptation process.

Next, at step 44, a frequency sweep with a low voltage magnitude (typically just a few volts) is applied to the motor(s) over a specified frequency range (e.g. 300-5000 Hz). The current resulting from the applied frequency sweep is then measured.

Next, at step 46, resonances in the system 20 are identified. The resonances detected are electrical resonances in the system 20.

Figure 5:
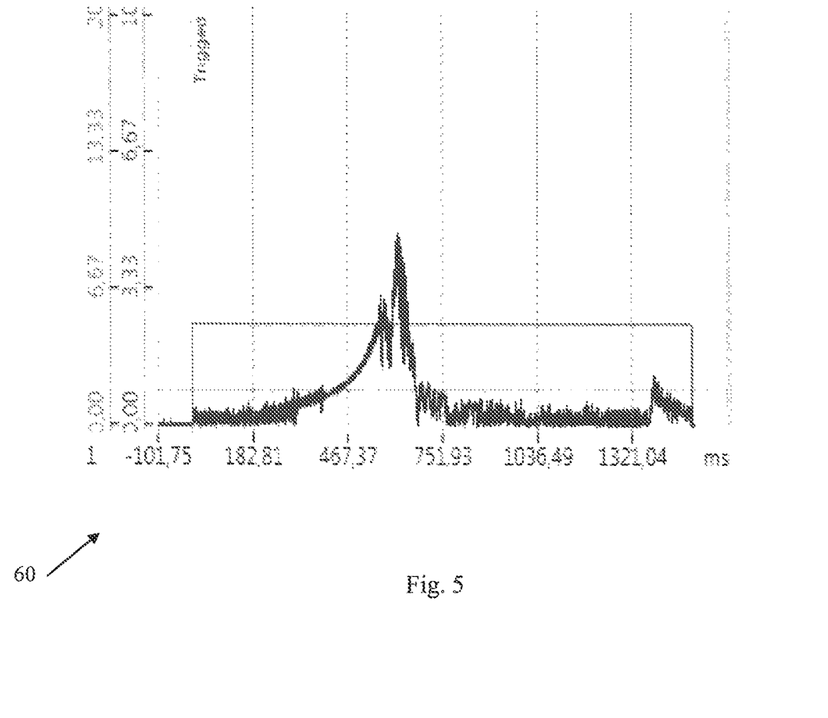
FIGS. 5 to 7 show plots of test applications of the present invention.

FIG. 5 shows a plot, indicated generally by the reference numeral 60, of a test application of the present invention. The test was conducted using a 500V drive and a 15 A filter. A frequency sweep from 100 Hz to 2 kHz was made with 5 V RMS voltage. The current noticeably peaks at the resonant frequency allowing detection of the resonant frequency (step 46 of the algorithm 40).

With the resonant frequencies in the system detected, the algorithm 40 moves to step 48 where it is determined whether tests have been applied at all desired DC magnetization levels. This step allows the steps 42 to 46 to be repeated for different levels of DC-magnetization to check how possible saturation of the inductors affects the resonance frequency.

If it is determined at step 48 that the algorithm 40 has not been applied at all desired DC magnetization levels, the DC magnetization level is incremented (at step 50) and the algorithm 40 returns to step 42. If it is determined at step 48 that the algorithm 40 has been applied at all desired DC magnetization levels, then the algorithm 40 moves to step 52.

Figure 6:
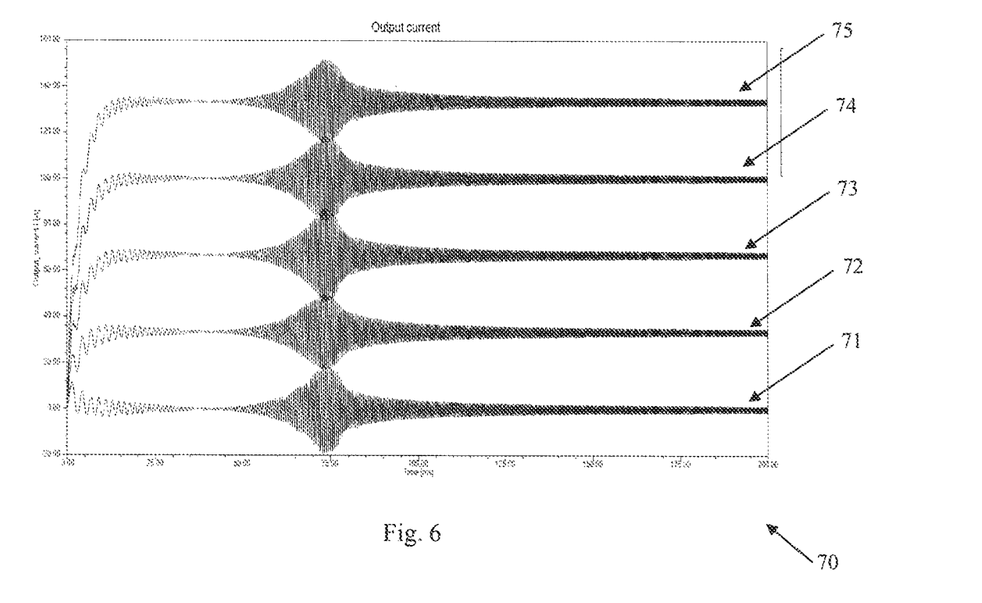

FIG. 6 shows a plot, indicated generally by the reference numeral 70, of an exemplary application of multiple frequency sweep steps 44 at different DC magnetization levels. The plot 70 shows the current output of five different instances of the frequency sweep step 44, indicated generally by the reference numerals 71 to 75.

The current output plot 71 is at a low DC magnetization level. The plot shows measured current plotted on the y-axis and time plotted on the x-axis. The frequency applied during the frequency sweep step 44 increases with time so that the frequency of the signal output by the ASD 4 is lowest at the start of the plot 71 (time t=0) and highest at the end of the plot 71 (time t=200 ms).

Each of the current plots 72 to 75 shows the measured current in response to successively higher DC magnetization levels.

As is clearly visible in the plot 70, each of the current plots 71 to 75 shows a similar resonance response, with the resonant current occurring at close to 75 ms. Thus, the frequency output of the ASD 4 of the motor drive system 20 at time t=75 ms gives the electrical resonant frequency of the system 20.

Figure 7:
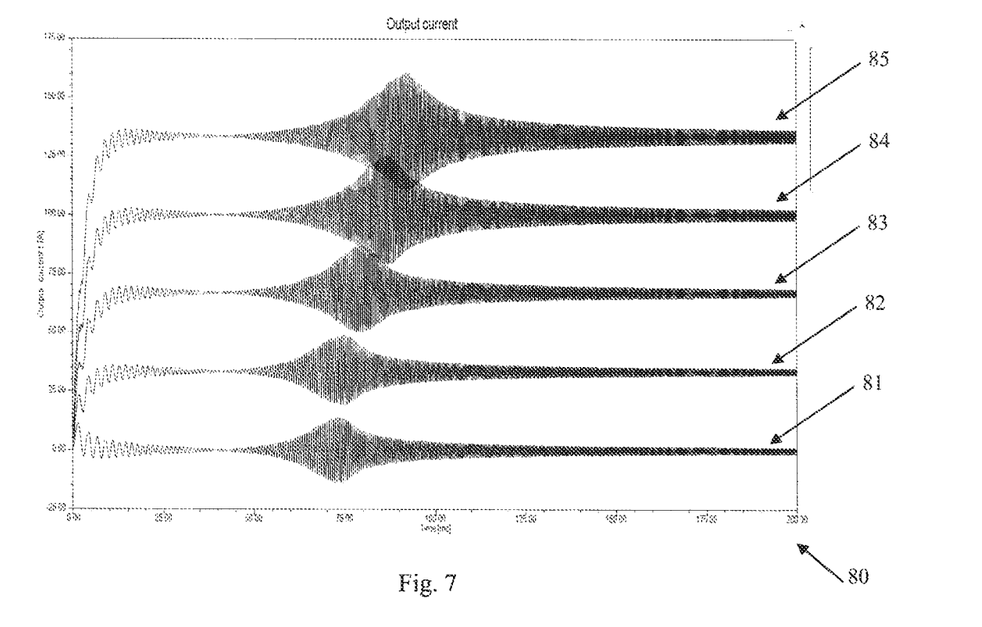

FIG. 7 shows a plot, indicated generally by the reference numeral 80, of a further exemplary application of multiple frequency sweep steps 44 at different DC magnetization levels. The plot 80 shows the current output of five different instances of the frequency sweep step 44, indicated generally by the reference numerals 81 to 85.

The current output plot 81 is at a low DC magnetization level and is therefore similar to the current output plot 71 described above. As with the plot 71, the current output ploy 81 shows resonant current occurring at close to 75 ms. Thus, the frequency output of the ASD 4 at time t=75 ms gives the electrical resonant frequency of the system 20.

The plot 80 differs from the plot 70 in the impact of increasing the DC magnetization level. In the plot 70, each of the current output plots 71 to 75 showed a similar resonant response. In the plot 80, as the DC magnetization level is increased (shown by current output plots 82 to 85), the resonant frequency changes, as does the amplitude of the measured current so that at the highest DC magnetization level (indicated by the current output plot 85), the resonant frequency is at about 90 ms.

The different frequency responses shown in the plot 80 are caused by, and can be used to measure, the impact of saturation of inductors in the motor drive system 20.

At step 52 of the algorithm 40, a number of variables of the system are determined or defined. These might include one or more of minimum, optimum and maximum switching frequencies for the system 20. These might also include parameters for control set to ensure stable operation for this specific system resonance frequency. This should give better dynamic performance in applications requiring sine filters.

In one form of the invention, an optimum switching frequency for the system 20 may be set at a predetermined multiple of the resonance frequency detected during the step 46 of the algorithm 40. By way of example, a frequency of three times the resonant frequency could be set. In the example described above with reference to FIG. 6, that frequency might be three times the frequency of the motor system at the time t=75 ms shown in FIG. 6. In the example described above with reference to FIG. 7, that frequency might be three times the frequency of the motor system at the time t=90 ms, such that the effect of saturation of the inductances in the motor system 20 are taken into account. Thus, it may be advantageous if the instances of the frequency sweep steps 44 occur over a range of DC magnetization levels that might reasonably be expected to occur during the operation of the motor system 20.

Depending on the possible performance of the drive (e.g. current sampling, frequency switching rate) it could also be possible to make the frequency sweep step 44 during normal operation.

A simple version of the algorithm 40 could be implemented without DC-magnetization (i.e. omitting the steps 42, 48 and 50 of the algorithm 40). If the voltage magnitude is low enough and starts at quite high frequency (perhaps above about 300 Hz) the rotor will most probably not turn. Another option would be to use asymmetric AC voltage which is not able to rotate the motor.

In the system 20 described above, the output of the output filter 22 is connected to the input of one or more motors. This is not essential to all forms of the invention. For example, a transformer (typically a step-up transformer) may be provided between the output filter and the motor. In such embodiments, the use of DC magnetization may not be possible, but it is still possible to perform the frequency sweep steps described herein.

The algorithm 40 (or a variant of it, for example omitting the DC magnetization steps) may be repeated with certain time intervals to detect if the preferable system variables (as set at step 52) change with time. Not only does this allow the variables to be changed as system performance changes, this may also be used to detect changing system performance and may, for example, provide a warning of a potential failure of components (such as filter components) which can occur, for example, due to ageing.

Figure 8:
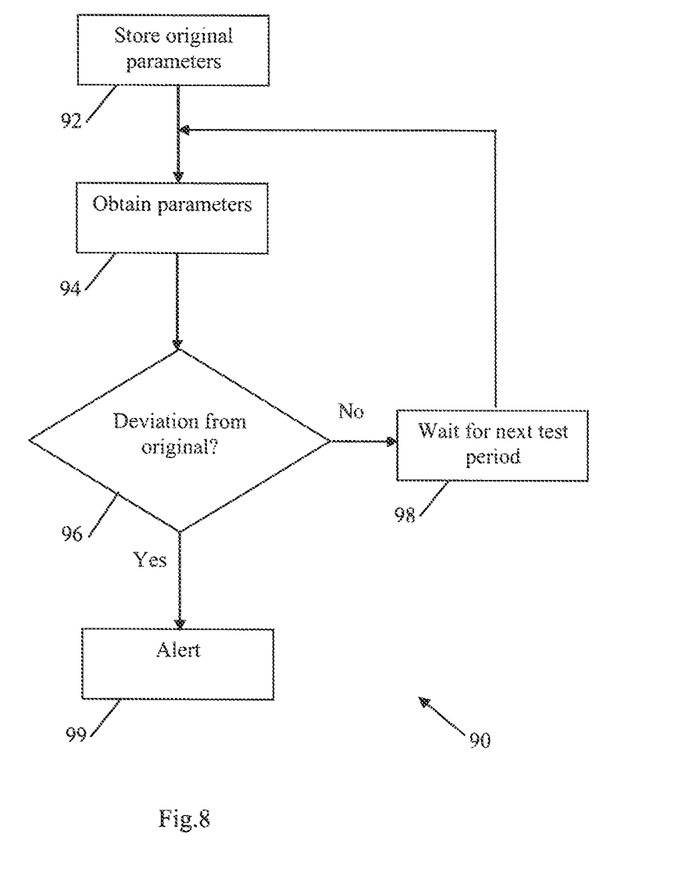
FIG. 8 is a flow chart showing an algorithm in accordance with an exemplary use of the present invention.

FIG. 8 is a flow chart showing an algorithm, indicated generally by the reference numeral 90, in accordance with exemplary use of the present invention.

The algorithm 90 starts at step 92 where original parameters for the system 20 are stored. Such parameters may be set at step 52 of the algorithm 40, but this is not essential. For example, such original parameters may be factory-set parameters.

Next, the algorithm 90 moves to step 94 where new parameters are set. The step 94 may implement the algorithm 40 described above (or a variant of that algorithm).

Following the step 94, it is determined in step 96 whether the parameters have changed from earlier parameters and, if so, the algorithm moves to step 99 where an alert is raised. If the parameters have not deviated from earlier parameters (or are within an acceptable tolerance), then algorithm 90 moves to step 98. In the step 96, parameters may, for example, be deemed to have changed if they have changed by a predetermined amount or a predetermined percentage.

At step 98, the algorithm 90 waits for the next test period before repeating the steps 94 and 96. The delay period may, for example, be one week or one month, but, of course, any period could be chosen. Further, the period could be variable (dependent, for example, on the age of the system 20). The step 98 could be implemented in many different ways, for example as an interrupt.

As described above, the step 96 may determine the difference between measured variables (in an instance of the step 52 of the algorithm 40) compared with original parameters (as set in step 92 of the algorithm 90). This is not essential. For example, the step 96 may determine the difference between measured variables in two difference instances of the step 52. A more sophisticated arrangement might, for example, compare measured variables with both the original parameters and previously measured variables in order to get an indication of how the determined variables have changed over time.

The embodiments of the invention described above are provided by way of example only. The skilled person will be aware of many modifications, changes and substitutions that could be made without departing from the scope of the present invention. For example, the principles of the present invention are not limited to use with a motor drive system of the form shown in FIG. 1. The claims of the present invention are intended to cover all such modifications, changes and substitutions as fall within the spirit and scope of the invention.

What is claimed is:

1. A method comprising:
applying a small signal frequency sweep to a motor drive system wherein the motor drive system includes an inverter, an output filter and a motor;
acquiring frequency response data in response to said frequency sweep in order to determine resonances in the motor drive system; and
setting parameters of the motor drive system depending on the acquired frequency response data;
wherein applying the small signal frequency sweep comprises applying a voltage signal to the motor.

2. The method as claimed in claim 1, wherein the voltage signal is a low voltage magnitude signal applied to the motor over a frequency range.

3. The method as claimed in claim 1, wherein said acquired frequency response data comprises current data as a function of frequency resulting from the applied frequency sweep.

4. The method as claimed in claim 1, wherein:
applying the small signal frequency sweep comprises applying multiple small signal frequency sweeps at different DC offset levels; and
acquiring frequency response data comprises acquiring frequency response data for each of said multiple small signal frequency sweeps.

5. The method as claimed in claim 1, further comprising:
applying a DC magnetising pulse and repeating said frequency sweep applying and frequency response data acquiring steps.

6. The method as claimed in claim 1, further comprising repeating said frequency sweep applying and frequency response data acquiring steps periodically.

7. The method as claimed in claim 6, further comprising determining whether a change in said frequency response data is indicative of a significant performance change.

8. The method as claimed in claim 1, wherein said parameters include one or more of a minimum, an optimum and a maximum switching frequency of said inverter.

9. The method as claimed in claim 1, wherein said output filter is a sine filter.

10. A motor drive system comprising an inverter stage, a control module and an output filter, wherein the control module is configured to set parameters of the motor drive system depending on a measured resonance frequency of the motor drive system, wherein the resonance frequency is measured in response to applying a small signal frequency sweep to the motor drive system, and wherein applying the small signal frequency sweep comprises applying a voltage signal to the motor.

11. The motor drive system as claimed in claim 10, wherein the small signal frequency sweep is applied under the control of said control module.

12. The motor drive system as claimed in claim 10, further comprising a cable connecting an output of the inverter stage to a motor.

13. The motor drive system as claimed in claim 10, wherein said parameters include one or more of a minimum, an optimum and a maximum switching frequency of said inverter stage.

14. The motor drive system as claimed in claim 10, wherein said output filter is a sine filter.

15. A control method, comprising:
applying a small signal frequency sweep to a motor drive system, the motor drive system including an inverter, an output filter and a motor;
acquiring frequency response data in response to said frequency sweep in order to determine resonances in the motor drive system; and
setting parameters of the motor drive system depending on the acquired frequency response data;
wherein applying the small signal frequency sweep comprises applying a voltage signal to the motor.

16. The method as claimed in claim 2, wherein said acquired frequency response data comprises current data as a function of frequency resulting from the applied frequency sweep.

17. The method as claimed in claim 2, wherein:
applying the small signal frequency sweep comprises applying multiple small signal frequency sweeps at different DC offset levels; and
acquiring frequency response data comprises acquiring frequency response data for each of said multiple small signal frequency sweeps.

18. The method as claimed in claim 3, wherein:
applying the small signal frequency sweep comprises applying multiple small signal frequency sweeps at different DC offset levels; and
acquiring frequency response data comprises acquiring frequency response data for each of said multiple small signal frequency sweeps.

19. The method as claimed in claim 2, further comprising:
applying a DC magnetising pulse and repeating said frequency sweep applying and frequency response data acquiring steps.

20. The method as claimed in claim 3, further comprising:
applying a DC magnetising pulse and repeating said frequency sweep applying and frequency response data acquiring steps.

21. The method as claimed in claim 8, wherein the optimum switching frequency is set at a predetermined multiple of the determined resonance frequency.

22. The motor drive system as claimed in claim 13, wherein the optimum switching frequency is set at a predetermined multiple of the determined resonance frequency.

23. The control method as claimed in claim 15, wherein said parameters include one or more of a minimum, an optimum and a maximum switching frequency of said inverter, wherein the optimum switching frequency is set at a predetermined multiple of the determined resonance frequency.

* * * * *